UNITED STATES PATENT OFFICE.

CARLE R. HAYWARD, OF QUINCY, HENRY M. SCHLEICHER, OF BOSTON, AND FREDERICK O. STILLMAN, OF MELROSE, MASSACHUSETTS, ASSIGNORS, BY MESNE ASSIGNMENTS, TO MOA IRON & DEVELOPMENT CORPORATION, OF DOVER, DELAWARE, A CORPORATION OF DELAWARE.

TREATMENT OF LEACH LIQUOR.

1,370,646.     Specification of Letters Patent.     Patented Mar. 8, 1921.

No Drawing.     Application filed December 8, 1919. Serial No. 343,362.

*To all whom it may concern:*

Be it known that we, CARLE R. HAYWARD, HENRY M. SCHLEICHER, and FREDERICK O. STILLMAN, all citizens of the United States of America, and residents, respectively, of Quincy, in the county of Norfolk; Boston, in the county of Suffolk, and Melrose, in the county of Middlesex, all in the State of Massachusetts, have invented new and useful Improvements in the Treatment of Leach Liquor, of which the following is a specification.

This invention relates to the treatment of iron ore or iron-bearing material referred to hereinafter simply as ore or iron ore, which contains also incidental metals such as aluminum, nickel, manganese and chromium, or some of them, for the purpose of extracting or recovering in valuable form the incidental metals, or some of them, while at the same time improving the quality of the ore for subsequent treatment in making pig iron and steel.

A principal object of the invention is to provide an economical and effective method of recovering the metals in useful form from the leach liquor consisting of a sulfate solution which results from leaching the ore after a sulfate roast. A further object of the invention is to convert said sulfate solution into a chlorid solution, which may be more economically and easily worked; and to perform this step by the use of calcium chlorid thereby producing as a by-product gypsum which may be calcined and marketed as plaster of Paris, or if desired, by the use of barium chlorid thereby producing barium sulfate as a by-product. In addition to gypsum ($CaSO_4.2H_2O$) and plaster of Paris made therefrom, or barium sulfate as the case may be, other valuable products obtained by the process are alumina, which may be sold as such or worked up by electrolysis to metal, iron oxid pigment, metallic nickel, and manganese dioxid. Or, instead of these materials it is possible to produce nickel or manganese compounds, or alloys of nickel, manganese or iron. These and other features will hereinafter be more fully described and particularly pointed out in the claims.

By the present method not only are economies and efficiency in the recovery of the desired constituents attained, but the cost of treatment is materially reduced by the fact that the reagents employed produce valuable by-products.

The process is particularly though not exclusively adapted to the treatment of such ores as the soft iron ores on the north coast of the island of Cuba, which occur as blanket deposits on top of the rocks forming that part of the island. These ores consist essentially of oxids or oxids and silicates of iron and aluminum, and contain also small amounts of nickel, manganese and chromium together with much water. It is believed that the principal utility of the present process is in connection with the treatment of such ores as said Cuban iron ores for the ultimate recovery of nickel and for the beneficiation of the iron ore for subsequent smelting. The presence of aluminum is detrimental to the iron ore for subsequent treatment to produce pig iron and steel, and therefore its removal is desirable. Moreover, the aluminum is valuable and is recovered for its own sake. In addition to alumina, metallic nickel and gypsum or plaster of Paris, the present process may also yield iron oxid pigment, and manganese dioxid, both of which are commercially valuable products.

The word gypsum is used throughout the specification and claims to designate an artificially prepared gypsum which has the same chemical symbol ($CaSO_4+2H_2O$) and the same crystalline form as gypsum found in nature.

While the invention is not limited to the treatment of said Cuban iron ores but is applicable to other ores possessing similar characteristics, the said Cuban ores will be used by way of illustration in the following description.

*I. Sulfating roast, leaching and reducing.*

The crude ore is dried and preheated in suitable preheating chambers and then subjected to a sulfating roast. The preheating is preferably performed by waste gases from the sulfate roasting furnaces, whereby there is absorbed from these gases the last available sensible heat and all but their last traces of sulfur dioxid.

After the preheating, the dried ore is subjected to a sulfating roast. This roast may be carried on in accordance with either of the methods set forth in Letters Patent of the United States granted to F. A. Eustis, January 16, 1917, No. 1,212,334, and June 19, 1917, No. 1,230,143. The roasting will preferably be done by the method described in the latter patent, that is, in the presence of an atmosphere containing sulfur dioxid gas.

The purpose of the sulfating roast is to convert into soluble sulfates as much as possible of the nickel and aluminum contained in the ore, and also incidentally to render soluble certain proportions of the manganese and of chromium if present. A small proportion of the iron will likewise be rendered soluble, although one of the principal advantages of this form of roast is that by far the greater part of the iron will be left insoluble. Experiment with the ore in question has shown that about 70% of the nickel, 40% to 60% of the aluminum and about 60% of the manganese may be made soluble, and also small proportions of the chromium, iron and silica.

The sulfur dioxid gas for performing the sulfating roast in accordance with said Eustis Patent No. 1,230,143 may be obtained by burning pyrites or other sulfur-containing substances within the furnace, or on outside hearths, and conveying the resulting sulfur dioxid gas into the roasting furnace, or by using smelter fumes containing $SO_2$, or by using liquid $SO_2$, or by any other means.

After the sulfate roasting step the roasted ore will be delivered from the roasting furnaces into leaching apparatus, where it will be leached with water or other lixiviant. The leach will be more efficient if the lixiviant is used hot, but fairly good recoveries can be made by leaching cold. By using a counter current method the strength of the leach liquor may be effectively built up.

The counter current leaching may be carried on either in settlers or in filters, in either case according to well known practices. The leach should be carried out with as small an amount of liquid as possible in order to secure a maximum concentration of the leach liquor. The maximum concentration of the leach liquor is desirable to avoid evaporation of a large amount of water, and also to cause a minimum re-solution of the precipitated calcium sulfate.

The leach liquor is preferably chemically reduced in order to minimize the amount of iron that will be precipitated with the alumina and to facilitate the production of white gypsum. Reduction has the further advantage that the corrosive effect of the liquor is lessened thus making it possible to simplify the construction of the apparatus. The chemical reduction may be accomplished by adding metallic iron to the ore while being leached, or by adding sulfur dioxid ($SO_2$) or by other suitable means.

Two products will result from the leaching, namely, (1) an iron ore residue which can be sintered to produce a high grade iron ore, and (2) a liquor which will contain chiefly sulfate of aluminum, sulfate of iron, sulfate of nickel, sulfate of manganese and sulfate of chromium.

*II. Forming a chlorid solution and obtaining gypsum or plaster of Paris.*

The leach liquor is first treated by mixing it with a concentrated aqueous solution of calcium chlorid ($CaCl_2$) in an agitator or similar apparatus. Calcium chlorid should be introduced to form calcium sulfate with all of the sulfates present; preferably a small excess will be used, since an excess does no harm in the subsequent steps of the process and causes a more complete precipitation of gypsum. In case of any hydrolysis it may be desirable to add a small amount of sulfuric acid before adding calcium chlorid. It is advantageous to continue the agitation of the material for about one hour in order to release any valuable constituents which might otherwise be carried down with the precipitate. It is also desirable to digest the precipitate in the mother liquor for at least three hours to insure the conversion into gypsum of any anhydrid that may be formed. The material is then filtered. The precipitate which results from this step is calcium sulfate with a certain amount of water of crystallization. If the precipitate is not white this may be corrected by bubbling $SO_2$ gas through the liquor in which the precipitate is formed; this will insure a white precipitate. The metals are not precipitated but remain in solution in the form of chlorids.

The precipitated calcium sulfate is first washed with a solution of calcium chlorid ($CaCl_2$). It is desirable that this solution be concentrated since the calcium sulfate is less soluble in a strong calcium chlorid solution than in water. The valuable constituents thus removed in the calcium chlorid solution are carried back into the process when this solution is added to the original leach liquor to convert the latter into chlorid. After washing with calcium chlorid the washing is finished with water to remove the calcium chlorid present.

By adding calcium chlorid to the sulfate solution as above described, a chlorid solution is obtained which may be more easily worked than a sulfate solution. Limestone used in a later step, presently to be described, is a cheap and effective precipitant for the iron and alumina. If the precipitation of the iron and alumina is from a sulfate solution a certain amount of calcium sulfate (or gypsum or both) will come down with the precipitates; whereas if the precipitation is from a chlorid solution a clean precipitate is obtained free of calcium sulfate. By adding calcium chlorid and so obtaining a chlorid solution, the sulfates are removed and prevented from coming down later in the process where they would contaminate the iron and alumina precipitates; also gypsum or plaster of Paris is obtained as a valuable by-product.

Instead of using calcium chlorid to convert the sulfate solution into a chlorid solution, barium chlorid or the chlorid of any other element whose sulfate is insoluble, might be used.

III. Obtaining alumina and iron oxid pigment.

An emulsion consisting of finely ground limestone (or other material containing a large proportion of calcium carbonate) and water is added slowly to the leach liquor from which the calcium sulfate has been precipitated and removed, and which now contains chlorids of iron, alumina, nickel and manganese, until all the alumina is precipitated. The ferric iron and trivalent chromium, if present, are precipitated with the alumina, but the nickel, manganese and ferrous iron remain in solution since under suitable conditions limestone has the capacity for selectively precipitating these metals in respect to their valence. That is, under these conditions limestone will precipitate trivalent metals, leaving divalent metals in solution. Any reagent in place of limestone adapted to precipitate alumina, with or without other trivalent metals, and to leave the divalent metals in solution, is within the scope of the invention, and is within the contemplation of the claims.

After the solution is made into a chlorid solution it is necessary to neutralize any free acid therein, because if free acid is present the iron and aluminum will not come down. The limestone neutralizes any free acid, and also reacts with the chlorids of ferric iron and aluminum to produce hydrates or hydroxids which are precipitated. Care must be exercised not to add more limestone than is necessary to precipitate all the trivalent metals as hydroxids; an excess above this amount tends to cause the precipitation of the nickel and ferrous iron.

The aluminum precipitate thus obtained is then removed from the liquor by filtration or otherwise and washed first with a dilute calcium chlorid solution, which may be concentrated and returned into the process, and then with water, which is usually in whole or in part sent to waste. This wash with dilute calcium chlorid washes out the metallic chlorids which are present, and also takes out traces of calcium sulfate which may be present. If it is found that the precipitate still contains calcium sulfate this may be removed by a wash with hot brine or sea water prior to the wash with water. Calcium sulfate is much more soluble in a hot salt solution than in hot water.

The washed precipitates are suitable material for the manufacture of aluminum oxid by the Bayer process. They contain beside the aluminum hydroxid little except ferric and chromic hydroxids, and these will not interfere with the Bayer process. The alumina may be sold as such or worked up by electrolysis to metal according to known methods. The residue from the Bayer process may be worked up and sold as a pigment or may be sintered with the ore, or treated for the recovery of the chromium.

IV. Removal of ferrous iron.

The leach liquor from which the alumina and ferric iron have been precipitated, containing chlorids of ferrous iron, nickel and manganese, is fed into an apparatus in which it can be agitated and intimately mixed with air and limestone emulsion for the purpose of oxidizing the ferrous iron and precipitating the ferric iron formed. The mixing may be conveniently performed in a vessel having a canvas bottom through which compressed air is forced in such manner that it will bubble up through the solution. This causes violent agitation as well as oxidation of the iron. The agitation and aeration of the solution should be continued for a sufficient time to accomplish the oxidation of the ferrous to ferric iron.

The oxidized iron is precipitated as a hydrated oxid by an emulsion of ground limestone in water. As when precipitating aluminum hydroxid, care must be taken not to add more limestone than is necessary to precipitate the iron. The precipitate may be burnt and sold as pigment, or otherwise disposed of as the market dictates.

V. Obtaining metallic nickel and manganese dioxid.

The leach liquor from which all the iron has now been precipitated, and which still contains nickel and manganese, is next treated in an agitating vessel with burnt lime (CaO), thereby precipitating manganese and nickel hydroxids. These are filtered off and thoroughly washed to yield a filter cake from which metallic nickel and manganese dioxid are recovered. After filtration we recommend repulping the precipitates so that they may be very thoroughly washed by a counter current method. A large part or all of the wash water will usually be sent to waste, although that containing the largest amount of calcium chlorid may be concentrated in evaporators and returned to the process. Following the countercurrent wash the precipitates are filtered out, and subjected to an electrolytic treatment.

In the electrolytic apparatus insoluble anodes will be used and nickel cathodes. Each anode and cathode may be inclosed in a canvas bag or other suitable diaphragm to prevent contamination of the deposits with foreign matter. The electrolyte consists essentially of sulfates of nickel and manganese made in the first instance by dissolving the precipitated hydroxids in sulfuric acid. While the process is in operation metallic nickel is deposited on the cathode and manganese dioxid on the anode. The electrolysis also liberates sulfuric acid at the anodes and there is a tendency for the solution to become more acid. It is kept at low acidity by introducing the hydroxids into the electrolytic tanks outside of the diaphragms. The acid is thus neutralized and the solution replenished in nickel and manganese. There should be at all times a clear solution within the diaphragms. That around the anodes is slightly acid as required for precipitation of manganese as dioxid. Any calcium sulfate that may be associated with the precipitates fed into the electrolytic tanks will accumulate at the bottom of the same and may be drawn off from time to time, washed, and either sold or returned to the process The acidity of the electrolyte for this step of the process is desirably kept very low. This may be accomplished without introducing the precipitates into the electrolytic tanks, by using a rapid circulation of the electrolyte through separate apparatus in which the precipitates are brought in contact with the electrolyte. If the electrolyte is so treated it may be possible to dispense with the diaphragms around one or both of the electrodes.

The liquor from which the manganese and nickel have been precipitated will be essentially a dilute calcium chlorid solution and may be concentrated in ordinary vacuum evaporators and returned to the process. It will be employed wholly or in part to wash the calcium sulfate precipitate as noted above, before being added to a new lot of leach liquor.

Each of the precipitates is of such a nature that it can readily be handled on a conveyer belt when it is in the form of a filter cake, or it can be conveyed through pipes when it is in the form of pulp, and the process as a whole can be conducted in a continuous operation with consequent cheapness in handling.

Although the sulfur which is continually being added to the process at the sulfate roasting step is not regenerated and put back into the process according to the method described in our former application Serial No. 246,471, filed July 24, 1918, it is by no means lost, but emerges in the form of calcium sulfate, the calcium being supplied by the introduction of calcium carbonate and burnt lime as reagents as hereinbefore described.

If the limestone used contains magnesium this element may be precipitated by the burnt lime with the nickel and manganese, and may be removed from the process by returning these precipitates to fresh portions of the solution containing nickel and manganese. The magnesium hydroxid will precipitate these metals. It may in turn be precipitated from the solution by adding further quantities of burnt lime.

A modification of the process for treating a solution which contains iron and nickel, with or without other metals, would be to precipitate the metals together, with burnt lime or other suitable reagent, and thereafter to smelt the precipitates into pig iron containing an important percentage of nickel.. If the market conditions warrant, any desired part of the iron might be first removed as hydrated oxid in the manner previously described, before the remainder of the iron and nickel are precipitated. The hydrated oxid would be disposed of as pigment or otherwise. Any manganese present could, if desired, be largely slagged off.

The term limestone throughout the specification and claims is used to denote all substances, whether natural or artificial, containing a large percentage of calcium carbonate.

We claim:

1. The method of treating a solution of a plurality of sulfates of metals differentiated in respect to their valence, which comprises converting the sulfate solution into a chlorid solution, and selectively precipitating certain of the metals with a reagent adapted to precipitate the same but to leave other of the metals in solution.

2. The method of treating a solution of a plurality of sulfates of metals differentiated in respect to their valence, which comprises converting the sulfate solution into a chlorid solution, and selectively precipitating certain of the metals with a reagent adapted to precipitate the same but to leave other of the metals in solution, and thereafter recovering the latter metals from the solution.

3. The method of treating a solution of a plurality of sulfates of metals differentiated in respect to their valence, which comprises adding calcium chlorid to the sulfate solution to obtain a chlorid solution and to form calcium sulfate with the sulfates present and precipitate calcium sulfate from the liquor; and selectively precipitating certain of the metals from the remaining liquor with a reagent adapted to precipitate the same but to leave other of the metals in solution.

4. The method of treating a solution of a plurality of sulfates of metals differentiated in respect to their valence, which comprises adding calcium chlorid to the sulfate solution to obtain a chlorid solution and to form calcium sulfate with the sulfates present and precipitate calcium sulfate from the liquor, selectively precipitating certain of the metals from the remaining liquor with a reagent adapted to precipitate the same but to leave other of the metals in solution, and thereafter recovering the latter metals from the solution.

5. The method of treating a solution of a plurality of sulfates of metals differentiated in respect to their valence, which comprises converting the sulfate solution into a chlorid solution, neutralizing the free acids in the chlorid solution, and selectively precipitating certain of the metals with a reagent adapted to precipitate the same but to leave other of the metals in solution.

6. The method of treating a solution of a plurality of sulfates of metals differentiated in respect to their valence, which comprises converting the sulfate solution into a chlorid solution, and adding limestone to the chlorid solution to neutralize the free acid therein and to react with the chlorids of certain of the metals and selectively precipitate the same leaving other of the metals in solution.

7. The method of treating a solution of sulfates of iron and other metals differentiated in respect to their valence, which comprises converting the sulfate solution into a chlorid solution, oxidizing the iron, and selectively precipitating the same by means of a reagent which will leave other of the metals in solution.

8. The method of treating a solution of sulfates of iron and other metals differentiated in respect to their valence, which comprises converting the sulfate solution into a chlorid solution, neutralizing the free acids in the chlorid solution, oxidizing the iron and selectively precipitating the same by means of a reagent which will leave other of the metals in solution.

9. The method of treating a solution of sulfates of iron and other metals differentiated in respect to their valence, which comprises converting the sulfate solution into a chlorid solution, adding limestone to the chlorid solution to neutralize the free acid therein and to react with the ferric iron and selectively precipitate the same leaving ferrous iron and other of the metals in solution, oxidizing the ferrous iron to ferric iron and selectively precipitating the ferric iron from the solution.

10. The method of treating a solution containing ferrous iron and alumina, which comprises selectively precipitating the alumina with limestone leaving the iron in solution.

11. The method of treating a solution containing ferrous iron and alumina, which comprises selectively precipitating the alumina with limestone leaving the iron in solution, and thereafter recovering the iron.

12. The method of treating a solution containing iron and alumina, which comprises reducing the iron, and selectively precipitating the alumina with limestone leaving the ferrous iron in solution.

13. The method of treating a solution containing iron and alumina, which comprises reducing the iron, and selectively precipitating the alumina with limestone leaving the ferrous iron in solution and thereafter recovering the iron.

14. The method of treating a solution containing iron and alumina, which comprises reducing the iron, and selectively precipitating the alumina with a reagent adapted to precipitate the same but to leave the ferrous iron in solution and thereafter oxidizing the iron and recovering the same.

15. The method of treating a material containing iron and alumina, which comprises subjecting the material to a sulfating roast, leaching the roasted material and reducing the ferric iron in solution to ferrous iron, precipitating the alumina leaving ferrous iron in solution, oxidizing the ferrous iron to ferric iron, and precipitating the latter.

16. The method of treating a material containing iron and alumina, which comprises subjecting the material to a sulfating roast, leaching the roasted material and reducing the ferric iron in solution to ferrous iron, converting the sulfate solution into a chlorid solution, precipitating the alumina leaving ferrous iron in solution, oxidizing the ferrous iron to ferric iron, and precipitating the latter.

17. The method of treating a solution containing sulfates of alumina and nickel, which comprises selectively precipitating the alumina with limestone leaving the nickel in solution.

18. The method of treating a solution containing sulfates of alumina and nickel, which comprises selectively precipitating the alumina with limestone leaving the nickel in solution and thereafter recovering the nickel.

19. The method of treating a solution containing sulfates of iron and of nickel, which comprises selectively precipitating the iron with limestone leaving nickel in solution, and thereafter recovering the nickel.

20. The method of treating a solution containing sulfates of iron and of nickel, which comprises converting the sulfates solution into a chlorid solution, and selectively precipitating the iron with a reagent adapted to precipitate iron but to leave nickel in solution, and thereafter recovering the nickel.

21. The method of treating a solution containing iron and manganese, which comprises selectively precipitating the iron with limestone leaving manganese in solution, and thereafter recovering the manganese.

22. The method of treating a solution containing sulfates of iron and of manganese, which comprises converting the sulfate solution into a chlorid solution, and selectively precipitating the iron with a reagent adapted to precipitate iron but to leave manganese in solution, and thereafter recovering the manganese.

23. The method of treating leach liquor of the character described containing sulfates of iron, of aluminum, of nickel, and of manganese, which comprises selectively precipitating iron and aluminum with limestone, leaving nickel and manganese in solution, and thereafter recovering nickel and manganese.

24. The method of treating leach liquor of the character described containing sulfates of iron, of aluminum, of nickel, and of manganese, which comprises selectively precipitating iron and aluminum with limestone, leaving nickel and manganese in solution, filtering the precipitate of iron and aluminum and washing the same with dilute calcium chlorid and water, and recovering alumina and ferric oxid from said precipitate.

25. The method of treating leach liquor of the character described containing sulfates of iron, of aluminum, of nickel and of manganese, which comprises selectively precipitating iron and aluminum with limestone, leaving nickel and manganese in solution, filtering the precipitate of iron and aluminum and washing the same with dilute calcium chlorids and water, recovering alumina and ferric oxid from said precipitate, and recovering nickel and manganese from the liquor from which the iron and alumina were precipitated.

26. The method of treating leach liquor of the character described containing sulfates of iron, of aluminum, of nickel and of manganese, which comprises selectively precipitating iron and aluminum with limestone, leaving nickel and manganese in solution, and treating the remaining liquor with burnt lime to precipitate nickel and manganese.

27. The method of treating leach liquor of the character described containing sulfates of iron, of aluminum, of nickel, and of manganese which comprises converting the sulfate solution into a chlorid solution; adding limestone to the chlorid solution to precipitate iron and alumina; and thereafter precipitating nickel and manganese.

28. The method of treating leach liquor of the character described containing sulfates of iron, of aluminum, of nickel, and of manganese, which comprises adding calcium chlorid to the sulfate solution to obtain a chlorid solution and to form calcium sulfate with the sulfates present and precipitate calcium sulfate from the liquor; treating the remaining liquor with limestone to precipitate iron and aluminum and thereafter recovering nickel and manganese.

29. The method of treating leach liquor of the character described containing sulfates of iron, of aluminum, of nickel, and of manganese, which comprises adding calcium chlorid to the sulfate solution to obtain a chlorid solution and to form calcium sulfate with the sulfates present and precipitate calcium sulfate from the liquor; treating the remaining liquor with limestone to precipitate the iron and aluminum; and treating the remaining liquor with burnt lime to precipitate nickel and manganese.

30. The method of treating leach liquor of the character described containing sulfates of iron, of aluminum, of nickel, and of manganese, which comprises adding calcium chlorid to the sulfate solution to obtain a chlorid solution and to form calcium sulfate with the sulfates present and precipitate calcium sulfate from the liquor; treating the remaining liquor with limestone to precipitate the iron and aluminum filtering the precipitate and washing the same with a dilute calcium chlorid solution, and recovering alumina and ferric oxid from said precipitate.

31. The method of treating leach liquor of the character described containing sulfates of iron, of aluminum, of nickel, and of manganese, which comprises adding calcium chlorid to the sulfate solution to obtain a chlorid solution and to form calcium sulfate with the sulfates present and precipitate calcium sulfate from the liquor; treating the remaining liquor with limestone to precipitate the iron and aluminum; filtering the precipitate and washing the same with a dilute calcium chlorid solution; and recovering nickel and manganese from the liquor from which the iron and alumina were precipitated.

32. The method of treating leach liquor of the character described containing sulfates of iron, of aluminum, of nickel and of manganese, which comprises adding calcium chlorid to the sulfate solution to obtain a chlorid solution and to form calcium sulfate with the sulfates present and precipitate calcium sulfate from the liquor.

33. The method of treating leach liquor of the character described containing sulfates of iron, of aluminum, of nickel and of manganese, which comprises reducing the ferric iron to ferrous iron, selectively precipitating the alumina leaving the ferrous iron, nickel and manganese in solution.

34. The method of treating leach liquor of the character described, containing sulfates of iron, of aluminum, of nickel and of manganese, which comprises reducing the ferric iron to ferrous iron, selectively precipitating the alumina leaving the ferrous iron, nickel and manganese in solution and thereafter recovering the latter metals.

35. The method of treating leach liquor of the character described containing sulfates of iron, of aluminum, of nickel and of manganese, which comprises reducing the ferric iron to ferrous iron leaving the ferric iron, nickel and manganese in solution, and thereafter oxidizing the ferrous iron and recovering the same.

36. The method of treating leach liquor of the character described containing sulfate of iron, of aluminum, of nickel and of manganese, which comprises reducing the ferric iron to ferrous iron, adding calcium chlorid, recovering gypsum, and thereafter selectively precipitating the alumina leaving the ferrous iron, nickel and manganese, and thereafter recovering the latter metals.

37. The method of treating a sulfate solution containing iron and alumina, which comprises adding calcium chlorid, recovering gypsum, and thereafter recovering the iron and alumina.

38. The method of treating a sulfate solution containing iron and alumina, which comprises reducing the ferric iron to ferrous iron, adding calcium chlorid, recovering gypsum, selectively precipitating the alumina, and thereafter recovering the iron.

39. The method of treating a sulfate solution containing iron and alumina, which comprises reducing the ferric iron to ferrous iron, adding calcium chlorid, recovering gypsum, selectively precipitating the alumina, oxidizing the iron, and thereafter recovering the iron.

40. The method of treating a sulfate solution which comprises adding calcium chlorid, and recovering gypsum.

41. The method of making gypsum which comprises adding calcium chlorid to a sulfate solution to precipitate calcium sulfate, and converting the calcium sulfate into gypsum.

42. The method of making white gypsum from solutions containing ferric iron, which comprises reducing the ferric iron to ferrous iron, adding calcium chlorid to precipitate calcium sulfate, and converting the calcium sulfate into gypsum.

43. The method of making white gypsum from a solution containing ferric iron, which comprises reducing the ferric iron to ferrous iron, adding calcium chlorid and recovering gypsum.

44. The method of lessening the corrosive effects of solutions containing ferric iron which comprises reducing the iron while in solution.

45. The method of treating leach liquor of the character described containing sulfates of iron, of aluminum, of nickel and of manganese, which comprises precipitating iron and alumina with limestone; adding burnt lime to the remaining liquor and agitating the mixture, to precipitate manganese and nickel in the form of hydroxids, removing and dissolving the precipitate and electrolyzing the solution to obtain metallic nickel and manganese dioxid.

46. The method of treating leach liquor of the character described containing sulfates of iron, of aluminum, of nickel and of manganese, which comprises adding calcium chlorid to the sulfate solution to obtain a chlorid solution and to form calcium sulfate with the sulfates present and precipitate calcium sulfate from the liquor, adding limestone to precipitate the iron and aluminum, recovering alumina and ferric oxid from the precipitate; adding burnt lime to the remaining liquor and agitating the mixture to precipitate manganese and nickel; removing and dissolving the precipitate, and electrolyzing the solution to obtain metallic nickel and manganese dioxid.

47. The method of treating material containing nickel which comprises bringing the material into contact with an electrolyte containing nickel, to neutralize the acidity generated by the electrolysis and thereby replenish the metal in the electrolyte, and electrolyzing to yield nickel at the cathode.

48. The method of treating material containing nickel which comprises bringing the material into contact with an electrolyte containing nickel, in an electrolytic cell, to neutralize the acidity generated by the electrolysis and thereby replenish the metal in the electrolyte, preventing the undissolved material from contacting with the cathode, and electrolyzing to yield nickel at the cathode.

49. The method of treating material containing nickel and manganese, which comprises bringing the material into contact with an electrolyte containing nickel and manganese, to neutralize the acidity generated by the electrolysis and thereby replenish the metals in the electrolyte, and electrolyzing to yield nickel at the cathode and manganese dioxid at the anode.

50. The method of treating material containing nickel and manganese, which comprises bringing the material into contact with an electrolyte containing nickel and manganese in an electrolytic cell, to neutralize the acidity generated by the electrolysis and thereby replenish the metals in the electrolyte, preventing the undissolved material from contacting with one or both electrodes, and electrolyzing to yield nickel at the cathode and manganese dioxid at the anode.

51. The method of treating material containing iron which comprises subjecting the material to a sulfating roast, leaching the roasted material, and reducing the ferric iron in solution.

52. The method of treating material containing iron which comprises subjecting the material to a sulfating roast, and leaching the roasted material in the presence of a substance adapted to reduce the ferric iron in solution.

53. The method of treating a solution containing iron and nickel which comprises precipitating the metals together with a suitable reagent, and thereafter reducing the precipitate to metallic form.

Signed by us at Boston, Massachusetts, this third day of December, 1919.

CARLE R. HAYWARD.
HENRY M. SCHLEICHER.
FREDERICK O. STILLMAN.